(12) United States Patent
Müller et al.

(10) Patent No.: US 7,730,308 B2
(45) Date of Patent: Jun. 1, 2010

(54) SYSTEM AND METHOD FOR PROVIDING AN USER'S SECURITY WHEN SETTING-UP A CONNECTION OVER INSECURE NETWORKS

(75) Inventors: Lorenz Müller, Biel (CH); Marcel Jacomet, Lengnau (CH); Roger Cattin-Liebl, Grenchen (CH); Alain Rollier, Steinen (CH)

(73) Assignee: Axsionics AG, Biel (CH)

( * ) Notice: Subject to any disclaimer, the term of this patent is extended or adjusted under 35 U.S.C. 154(b) by 1086 days.

(21) Appl. No.: 11/402,111

(22) Filed: Apr. 11, 2006

(65) Prior Publication Data

US 2006/0230268 A1  Oct. 12, 2006

(30) Foreign Application Priority Data

Apr. 11, 2005  (EP) .................... 05102820

(51) Int. Cl.
*H04L 9/00* (2006.01)
*H04L 9/32* (2006.01)

(52) U.S. Cl. ............................ 713/168; 713/189; 726/2

(58) Field of Classification Search ................. 726/2–5, 726/9–10, 20; 713/168, 176, 179, 181, 185, 713/189, 192–194

See application file for complete search history.

(56) References Cited

U.S. PATENT DOCUMENTS

| 6,169,805 | B1 | 1/2001 | Dunn et al. |
| 6,377,690 | B1 * | 4/2002 | Witschorik ............... 380/268 |
| 6,971,017 | B2 * | 11/2005 | Stringer et al. ............ 713/182 |

(Continued)

FOREIGN PATENT DOCUMENTS

DE  19859409  7/2000

(Continued)

OTHER PUBLICATIONS

Tan Teik Guan, "Phishing Redefined—Preventing Man-in-the-Middle Attacks for Web-based Transactions", Data Security Systems Solutions PTE Ltd Technical Disclosure, Mar. 2005, www.dsssasia.ci/htmdocs/company/news_events/Phishing_redefined—Preventing_Man-in-the-Middle-Attacks.pdf.

(Continued)

*Primary Examiner*—Hosuk Song
(74) *Attorney, Agent, or Firm*—The Webb Law Firm

(57) ABSTRACT

A method for setting up a secure communication line between a user and a service provider using non-secure communication channels within an insecure network, comprising the steps of transmitting an identity token from a user station to a service provider station both coupled to the insecure network; upon reception of the identity token, triggering the creation of a secret URL by the service provider station; transmitting the secret URL within a secure side channel to the user station; obtaining, within the user station, the secret URL, and setting-up a new communication path in the insecure network linking the user and the service provider station based on said secret URL. Beside discarding a man-in-the-middle by denying him access to the data flow it is also possible to stop him through denying him access to the content of the data flow. Such access can be denied through use of a one-time codebook with semantics only known to the User and the authentication service provider.

12 Claims, 6 Drawing Sheets

U.S. PATENT DOCUMENTS

Figure 1:
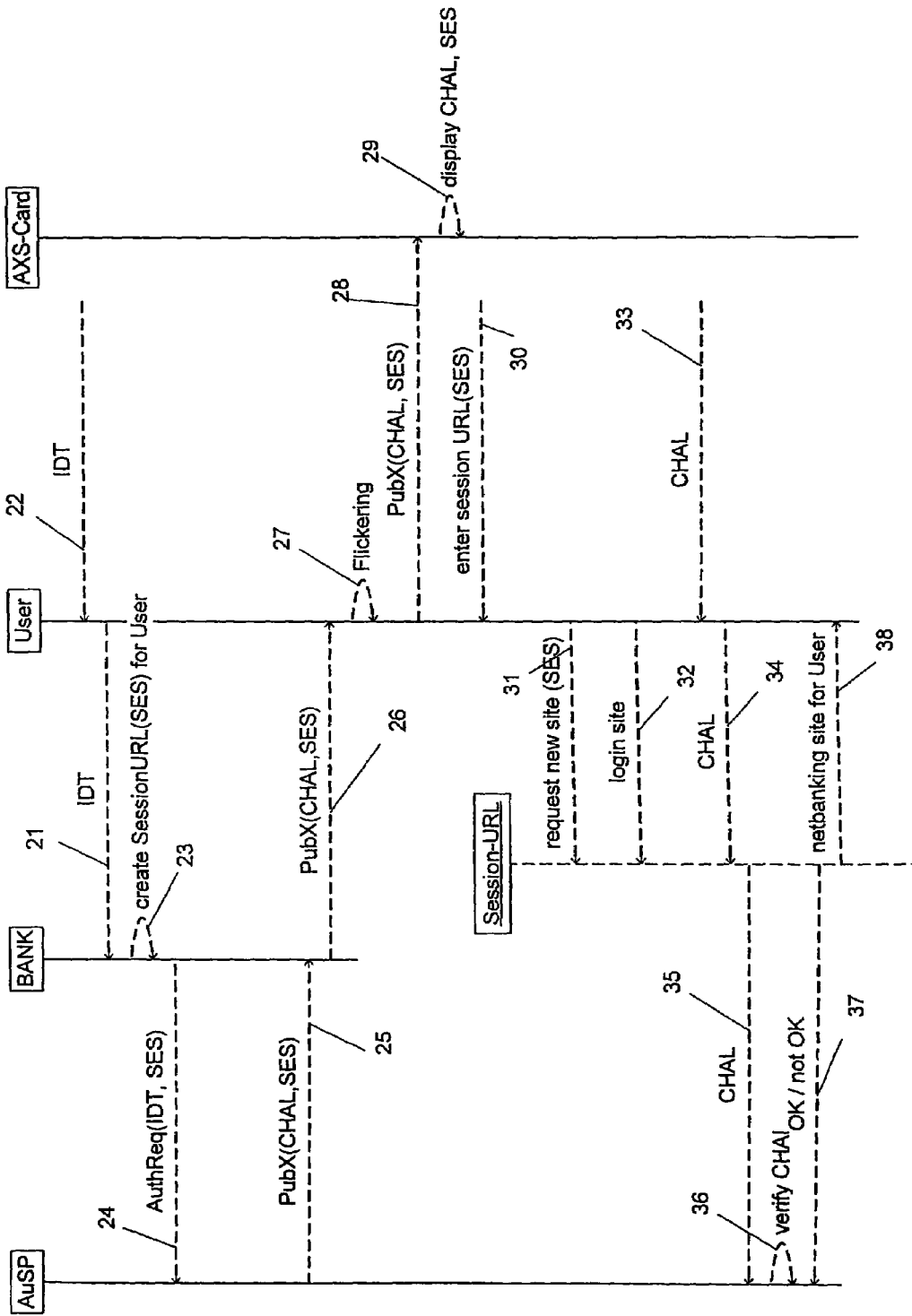

2002/0133697 A1  9/2002  Royer et al.
2004/0230825 A1  11/2004  Shepherd et al.

FOREIGN PATENT DOCUMENTS

| EP | 1102157 | 5/2001 |
| EP | 1255178 | 11/2002 |
| EP | 1480107 | 11/2004 |
| WO | WO 03/084127 | 10/2003 |

OTHER PUBLICATIONS

Jonathan Tuliani, "The Future of Phishing", Whitepaper, Cryptomathic Ltd., 2004, www.cryptomathic.com/pdf/TH%20Future20of%20Phishing.pdf.

Sangjin Kim et al, "A New Universally Verifiable and Receipt-Free Electronic Voting Scheme Using One-Way Untappable Channels", Content Computing. Advanced Workshop on Content Computing. AWCC 2004. Proceedings (Lecture Notes in Computer Science vol. 3309) Springer-Verlag Berlin, Germany, 2004, pp. 337-345.

\* cited by examiner

SYSTEM AND METHOD FOR PROVIDING AN USER'S SECURITY WHEN SETTING-UP A CONNECTION OVER INSECURE NETWORKS

TECHNICAL FIELD OF THE INVENTION

The present invention relates generally to cryptography and, more particularly, to the set-up of a secure transmission and/or secure transmission line between a user and a service provider using non-secure communication channels. The invention especially relates to a protocol that prevents phishing and man-in-the-middle attacks including eavesdropping to use the obtained information thereafter.

PRIOR ART

So-called phising or phishing attacks are a substantial threat for all kinds of transactions based on a secure and authentified access to a server. Economically important types of transactions are so called e-banking, e-voting, e-healthcare and further electronic services. A phishing attack usually comprises the use of social engineering, to fool the user to exchange secret data, e.g. log-on data, with the attacker. The user undertaking such a log-on procedure believes he communicates and exchanges data with the correct provider. The attacker, a man-in-the-middle, uses the transmitted authentication data thereafter or simultaneously to affect a log-on procedure with the service provider under the identity of the attacked authorized user. Following the log-on procedure the attacker than misuses the user's rights.

Within this meaning a phishing attack is a classical so called man-in-the-middle attack, which cannot be fend off easily through pure cryptological measures. It is not a very successful measure trying to elucidate the users because it is sufficient that only a very small portion of the users fall for such a social engineering mislead.

U.S. Pat. No. 6,169,805 provides a method for decrypting at a receiver station a file and uses therefore a side-channel over a conventional PSTN to transmit a key and an identified URL where the crypto software is stored in the insecure network.

SUMMARY OF THE INVENTION

One object of the invention is to provide a fully secure cryptographic technique for enabling privacy of communication between a user and a service provider initially started over non-secure channels.

It is a further object to set-up a secure communication channel between the user and a service provider while requiring no visible exchange of any cryptographic keys, either public or private.

Accordingly, it is an object of this invention to allow two parties to the communication to exchange the initial set-up messages even though another party (an eavesdropper) intercepts all of their communications.

It is a further object to set-up a secure communication between the user and a service provider while requiring no visible exchange of any cryptographic keys, either public or private.

Accordingly, it is a further object of this invention to allow two parties to the communication to successful exchange information, e.g. transaction information even though another party (an eavesdropper) intercepts all of their communications.

The successful strategy against phishing attacks is based on a technical solution, which does not depend on the credulity of the users. This strategy does not hamper the availability of services or the ergonomics of the authentication protocol in an undue way.

The simplest solution of the problem comprises, for every communication, to open ad hoc a new cryptographical secured channel between a user and a service provider (point-to-point https-connection). This happens after the user and, eventually, the service provider had performed a correct authentication. The information to create such a secure channel in order to cut-off any man-in-the-middle attacker has to be secret. The information to be transmitted can be the new secure URL. The creation of the new channel necessitates an user intervention, e.g. choice of a new URL, since the service provider cannot determine with certainty, where the authorized user is located within the network, because there is no secure connection between the IP-address and the user. This means that the new secret URL has to be communicated to the authorized user in a way that a potential attacker has no access to this information. This is equivalent to the statement that only the authorized user can have this dial-up information.

This can happen through use of a side-channel used to transmit information relating to this secret dial-up information, e.g. card with one-use-URLs, transmission of a SMS, synchronized algorithm to generate an authentication token, calculation based on a seed information with help of a authentication calculator etc. All these solutions allow the transmission of a secret URL (uniform resource locator); they are however potentially unsafe (as a code card), not readily practicable (as a SMS transmission) or unsafe or inflexible (algorithm to generate code).

The best mode relies on a direct ad hoc transmission of the secret URL address from the service provider to the user, without the possibility for the attacker to obtain the information. This can be realized by transmission of a crypto-container with the URL address into a personal token of the user. Every challenge response authentication protocol or any other protocol with at least one protected transmission channel from the service provider to the user can be used in principle to this purpose. Instead of the usually transmitted one-time-password the URL information is transmitted. The use of said secret URL proves the authenticity of the user.

Beside the preferred application ensuring that the man-in-the-middle can no longer intercept the data flow, another application is the transmittal of safe information through the man-in-the-middle being still online and listening, wherein a one-time code with secret semantics ensure that the man-in-the-middle cannot use the information he has obtained. Therefore his presence in the line is no longer a problem for the user.

One preferred embodiment of the invention uses the procedure according to the above and can be readily implemented using the communication system of EP 1 255 178 and the communication protocol shown in DE 198 59 409. Further different implementations using local readers in combination with smart cards or the use of security token systems (e.g. a time coded calculator as used for the internet banking system by UBS Switzerland or a RSA secure ID) are possible.

SHORT DESCRIPTION OF THE DRAWINGS

Figure 2:
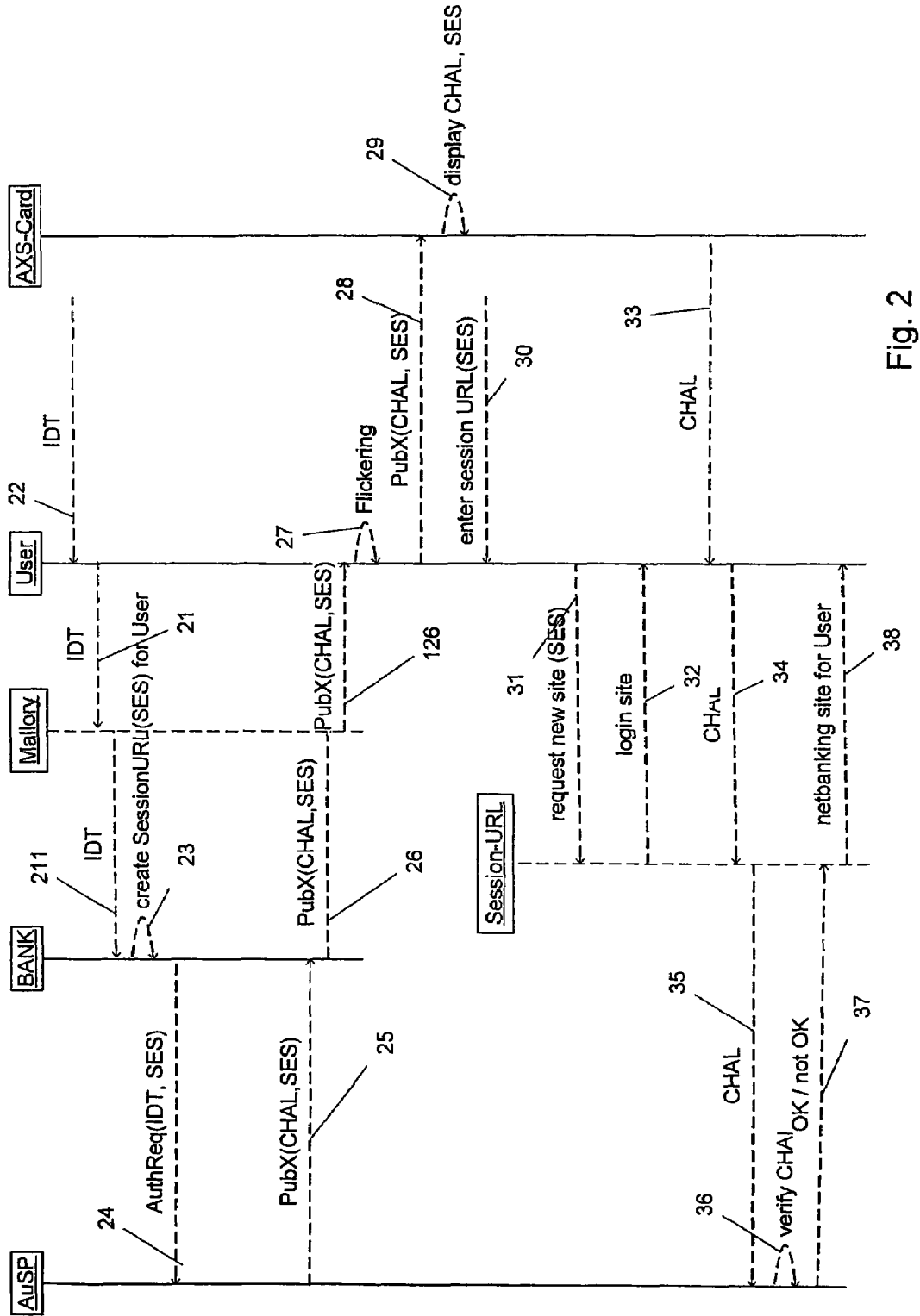
Figure 3:
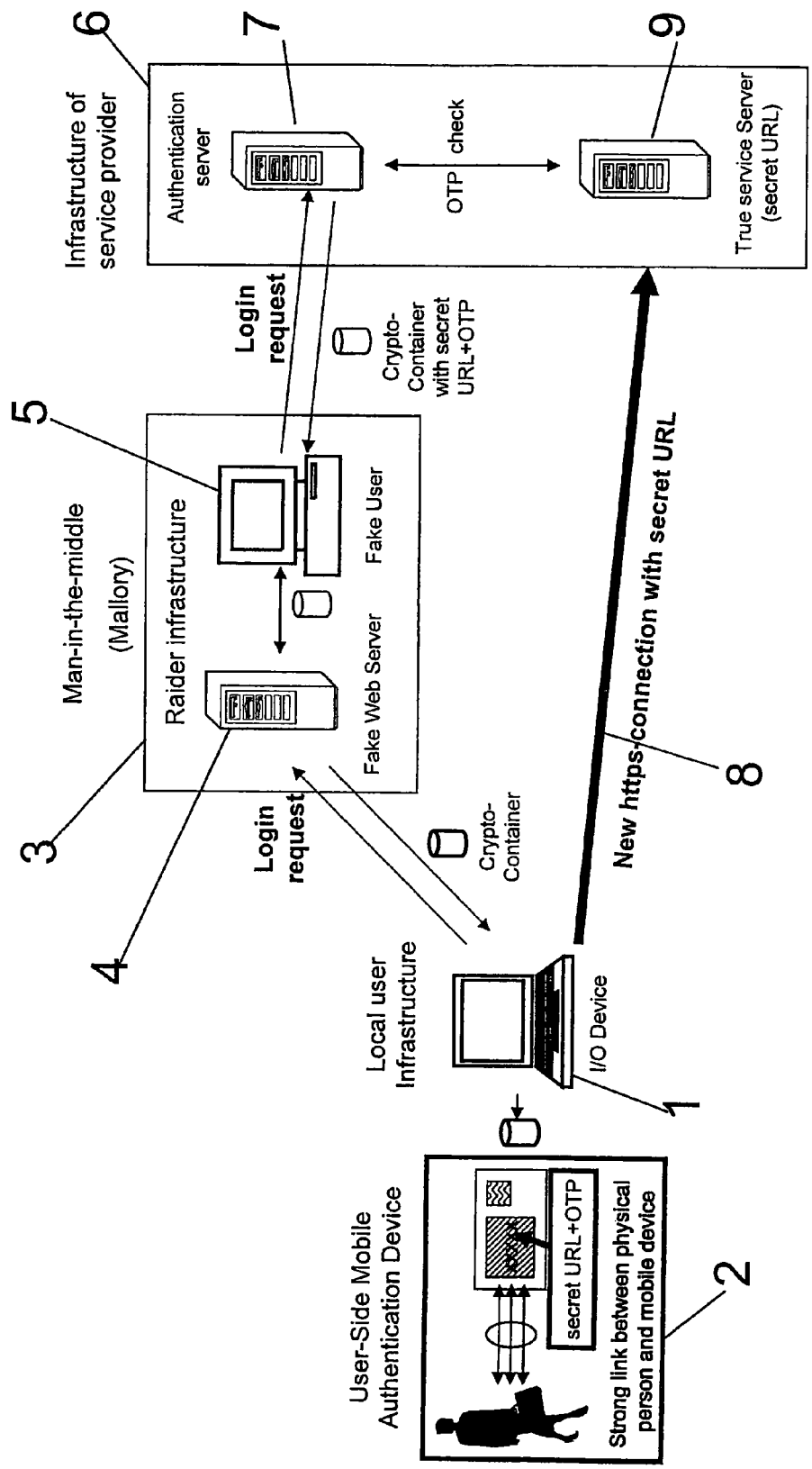
Figure 4:
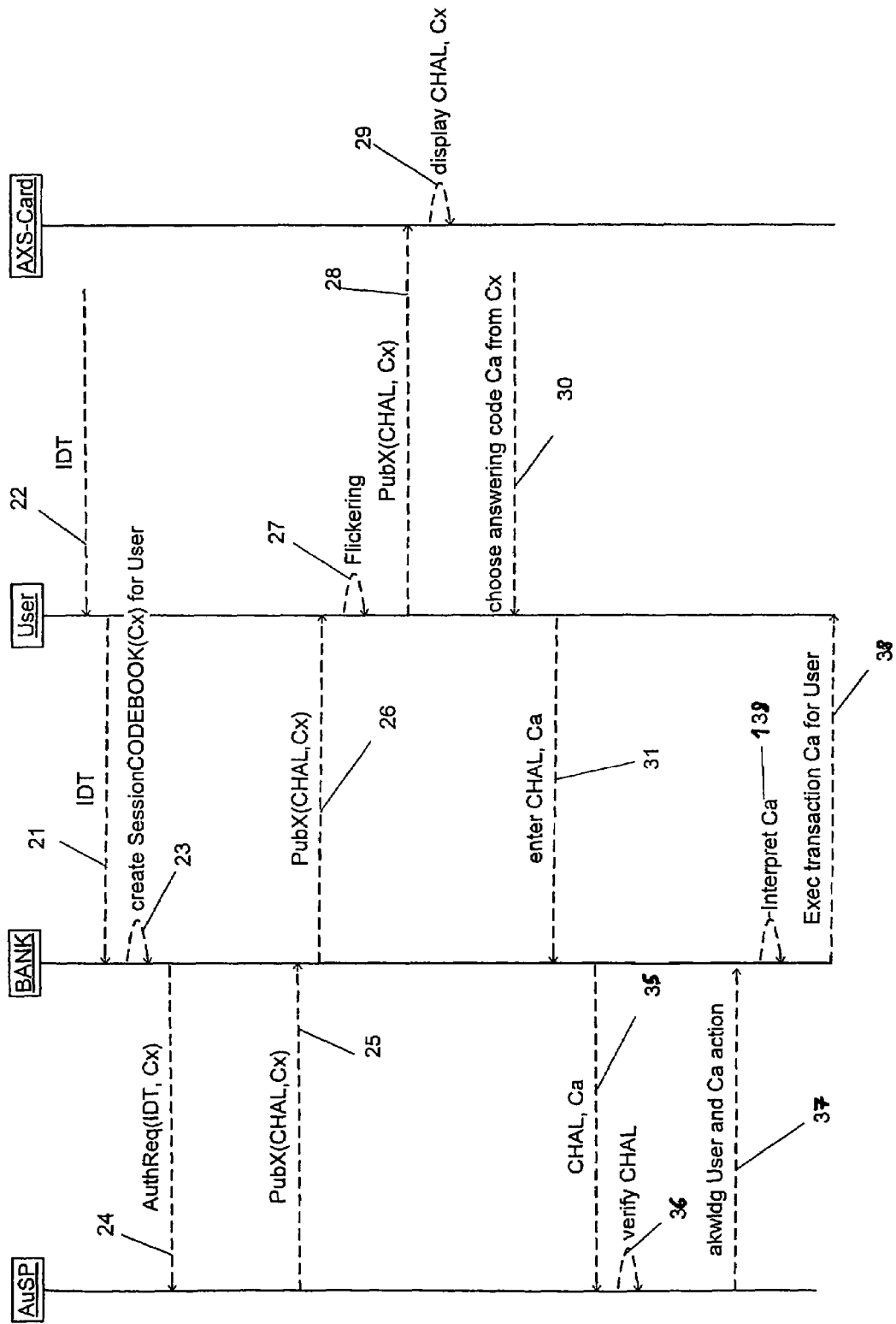
Figure 5:
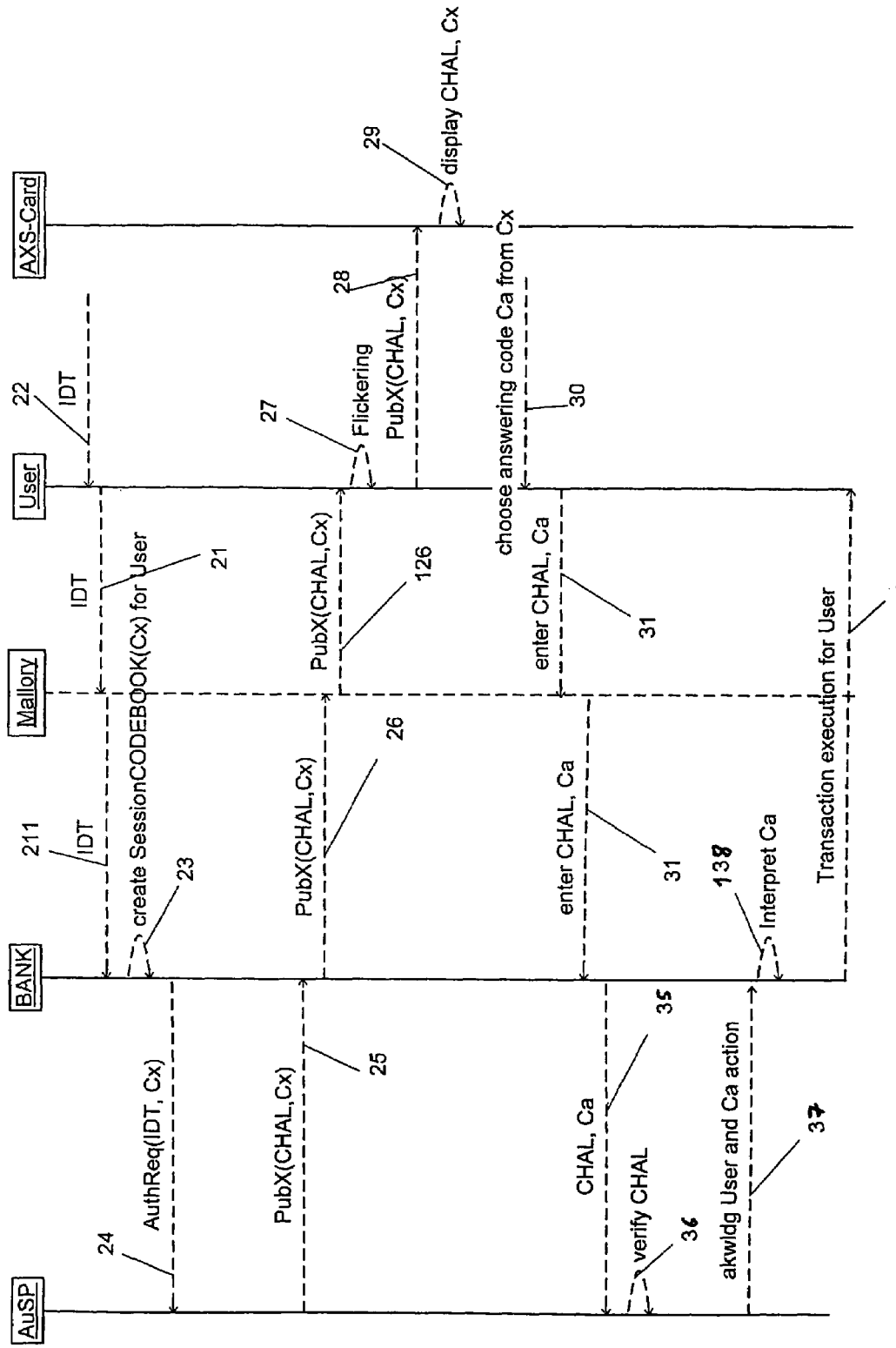
Figure 6:
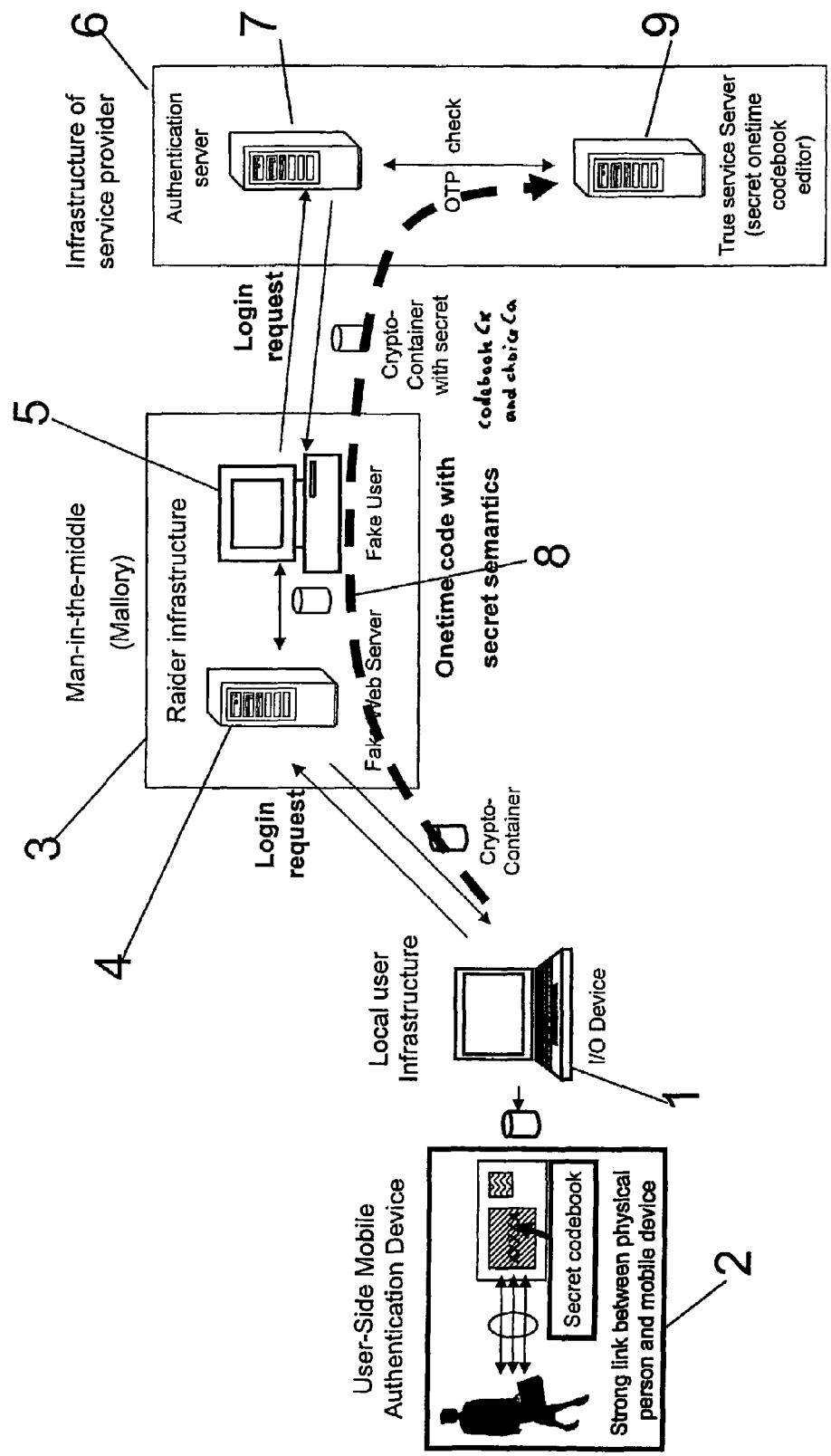

Preferred embodiments of the invention will now be described in connection with the accompanying drawings:

FIG. 1 shows a block diagram of the use of a first protocol according to the invention in the usual environment, wherein the user is not under attack, FIG. 2 shows a block diagram of the use of the protocol shown in FIG. 1 in an environment, wherein the user is under attack, FIG. 3 shows a simplified block diagram of the configuration shown in FIG. 2, FIG. 4 shows a block diagram of the use of a second protocol according to the invention in the usual environment, wherein the user is not under attack, FIG. 5 shows a block diagram of the use of the protocol shown in FIG. 4 in an environment, wherein the user is under attack, and FIG. 6 shows a simplified block diagram of the configuration shown in FIG. 5.

DETAILED DESCRIPTION OF PREFERRED EMBODIMENTS

To ease the reading of this document the entities appearing in the protocols are named after the following schema:

| Entity | Description | Name |
| --- | --- | --- |
| AXS-Card | AXS Token used for Authentication | AXS-Card |
| User Browser | Internet Browser the user is using | BOB |
| Net banking Server | Webserver the net banking runs on (i.e. https://www.somebank.com) | BANK |
| Authentication Service Provider | AXS Authentication Server | AuSP |
| Net banking Server for SES | The webserver which is used for the net banking (also containing a session URL) (i.e. https://sec.somebank.com/123 456) | ALICE |
| Man in the Middle | Webserver running on (https://www.somebank.net) rerouting all traffic from the User (BOB) to the real server of the bank (https://www.somebank.com) or simply listening on the line used by the user | MALLORY |

The entities stand for functional tasks in the communication process. They may be integrated in one or several computing machines. All identical features receive the same reference denominations and numerals throughout the description.

FIG. 1 shows the use of a first protocol according to the invention in an application for an internet site using HTTP-technology and a browser without an attack "man in the middle". The protocol runs as follows in the case of the use of a netbanking service: The user (BOB) uses terminal equipment 1 to open the net banking website (e.g. https://www.somebank.com) (BANK) in his browser, which is shown as arrow 21. BOB enters the AXS-card number (IDT) from the access card 2 as e.g. username (can also be something different). The operation of entering data 22 over 21 can be done manually by typing a code from a display on the card 2 or electronically with a smart-card reader of an ASIC within the smart card, a magnetic strip on the card or through emission of radiation in a relevant pattern. In this case the AXS-card number is not a token but an identity claim issued by BOB. In other embodiments this may be a token.

BANK now creates 23 a unique session URL (SES) (e.g. https://sec.somebank.com/123456) pointing to ALICE.

SES and IDT are sent 24 to the Authentication Service Provider (AuSP) for an Authentication Request.

AuSP creates a Challenge (CHAL) and encrypts CHAL and SES with the public key of the logical card (PubX) (i.e. the AXS card). This is sent back 25 to BANK. BANK sends the request 26 more or less unchanged back to BOB.

Preferably, the browser transmits 27 and 28 the request using the optical interface in the card 2. Said flickering corresponds to a transmittal of a code, e.g. according to EP 1 255 178.

However other, simpler approaches can be used. BOB's internet browser of his terminal equipment 1 can e.g. simply show 27 a code being the equivalent of the flickering, which has than to be, entered manually 28 into the card 2.

The card 2 extracts 29 CHAL and SES and displays them in an alphanumerical way, being a URL (unified resource locator). BOB enters 30 SES in the browser of its terminal equipment 1. The browser opens 31 a new connection to the URL given with SES (ALICE). ALICE sends 32 the login site to BOB. BOB enters 33 CHAL in the login site, and sends 34 it back to ALICE. ALICE sends 35 CHAL to the AuSP. AuSP verifies 36 CHAL and sends 37 the result of the verification back to ALICE. The result can only be "ok" or "not-ok". If CHAL verified successfully BOB enters 38 the normal net banking site.

The same procedure is now described with a so called Man in the Middle shown in FIG. 2. The protocol runs as follows: The user (BOB) receives e.g. a phishing email from "the man in the middle" (MALLORY) containing a link (https://www-.somebank.net) to a site looking like his normal net banking website; but being slightly different as here in the top level domain. Recently it has been demonstrated by Eric Johanson that the Internationalized Domain Names Standard (IDN) comprises a structure enabling an exploit to mislead users in the representation of IDN domain names, if International Domain Name support is enabled in modern browsers, allowing attackers to spoof domain name URLs+SSL certificates. In such a case even the domain name representation is identical to the original web site's URL.

But the site opened by clicking the link is not the official net banking site, it is a site on the webserver of MALLORY, which only acts as a proxy. BOB could see the fraud by verifying the server certificate, but this is usually not done and is cumbersome. The invention allows a for a simple counter measure to securely transmit the necessary information to enter the intended web site even through MALLORYs presence.

BOB enters 21 the AXS-card number (IDT) provided 22 by the card 1 as username (can also be something different as mentioned above). IDT is sent 21 to MALLORY, which sends 211 it unchanged to the official net banking site (BANK). BANK creates 23 a unique session URL (SES) (i.e. https://sec.somebank.com/123456) pointing to ALICE. SES and IDT are sent 24 to the Authentication Service Provider (AuSP) for an Authentication Request. AuSP creates a Challenge (CHAL) and encrypts CHAL and SES with the public key of the logical card (PubX). This is sent 25 back to the BANK. BANK sends 26 the request back to MALLORY which sends 126 it back to BOB.

BOB's browser transmits the request using the optical interface into the card 2 as mentioned above or uses another means. The card 2 extracts 29 CHAL and SES and displays 27 and 28 them. BOB then enters 30 SES in his browser. The browser opens 31 a new connection to the URL given with SES (ALICE). At this point MALLORY cannot track the net banking activity of BOB anymore, because the URL provided to BOB is not available to MALLORY. Therefore the remaining procedure is running equivalent to the procedure according to FIG. 1, i.e. ALICE sends 32 the login site to BOB. BOB enters 33 CHAL in the login site, and transmits 34 it back to ALICE. ALICE sends 35 CHAL to the AuSP. AuSP verifies 36 CHAL and sends 37 the result of the verification back to ALICE. If CHAL verified 38 successful, BOB enters the normal net banking site.

The important fact is that MALLORY exploits a less than 100% attentiveness of BOB. As soon as the user is fully authenticated he steals the session and can do whatever he wants.

Because the new URL for the net banking (ALICE) is sent directly into the card, the "man in the middle" (MALLORY) cannot track the whole net banking session of the user (BOB). The connection from BOB to MALLORY is closed when BOB enters the new URL to ALICE, displayed on the AXS-Card. Starting from that point MALLORY is locked out, because BOB has now a direct channel to ALICE. Even if Mallory spoofs the typed ad hoc URL and tries himself to connect directly to the net banking site he misses the challenge which the user will not submit prior to the established connection with ALICE.

FIG. 3 shows a simplified block diagram of the configuration shown in FIG. 2. The user at the local user infrastructure 1 requests a login on a fake service provider web server 4. This fake service provider web server 4, together with a fake user terminal equipment 5, constitutes mainly the raider infrastructure 3 of the man in the middle, MALLORY.

The login request is communicated within the raider infrastructure 3 to repeat it as a login request from the fake user equipment 5 for the structure 6 of the service provider. The authentication server 7 creates the secret URL and a One Time Password (OTP) and encloses these items within a crypto-container using the public key of the autonomous mobile authentication device 2. This crypto-container is transmitted to the requesting system, here the man in the middle, who is forced to transmit this container—unreadable to him, to the user station 1. Through use of smart card technology as described in EP 1 480 107 or EP 1 255 178 the container is detected and decrypted using the key stored in the authentication device 2, preferably protected by biometric data. The secret URL is extracted and entered into an i/o-device of the user terminal equipment 1, thus opening a new channel 8 based on the secret URL, reaching towards the true service server 9 within the service provider infrastructure 6.

The detection of the container can also be performed within the terminal equipment 2 through the user itself or the information can be passed to an authentication device by different modulated light or acoustic signals, e.g. for a mobile phone being able to provide the URL as output.

It is also possible to create a different side channel through transmitting of the URL through an SMS or a telephone line.

FIG. 4 shows the use of a second protocol according to the invention in an application for an internet site using HTTP-technology and a browser without an attack "man in the middle" to transmit an transaction enabling code. The protocol runs as follows in the case of the use of a service asking for some user instructions to validate an action; this might be a banking transaction.

The parts of this protocol and the related drawings in FIG. 4 to 6 being identical to the protocol according to FIG. 1 to 3 are only explained in a shorter version. Usually same reference numerals and description terms are used for identical or similar features.

The user (BOB) uses terminal equipment 1 to open the net banking website (e.g. https://www.somebank.com) (BANK) in his browser, which is shown as arrow 21. BOB enters the AXS-card number (IDT) from the access card 2 as e.g. username (can also be something different). The operation of entering data 22 over 21 can be done manually by typing a code from a display on the card 2 or electronically with a smart-card reader of an ASIC within the smart card, a magnetic strip on the card or through emission of radiation in a relevant pattern. In this case the AXS-card number is not a token but an identity claim issued by BOB. In other embodiments this may be a token.

BANK now creates 23 a unique session Codebook (Cx) for BOB.

Codebook Cx and IDT are sent 24 to the Authentication Service Provider (AuSP) for an Authentication Request.

AuSP creates a Challenge (CHAL) and encrypts CHAL and Cx with the public key of the logical card (PubX) (i.e. the AXS card). This is sent back 25 to BANK. BANK sends the request 26 more or less unchanged back to BOB.

Preferably, the browser transmits 27 and 28 the request using the optical interface in the card 2. Said flickering corresponds to a transmittal of a code, e.g. according to EP 1 255 178.

The card 2 extracts 29 CHAL and Cx and displays them in an alphanumerical way, being e.g. a list of choices C1 to Cn from Cx. BOB enters 30 his choice Ca from the possible choices C1 to Cn in the browser of its terminal equipment 1. The browser sends this information 31 to the BANK. BANK sends 35 the (unchanged) information to AusP. AuSP verifies 36 CHAL and sends 37 the result of the verification, i.e. the combination of User information and Ca action back to BANK. The BANK interprets 138 Ca on the basis of the onetime code with secret semantics, i.e. the Session Codebook Cx for the User and if this interpretation is verified correct than the transaction Ca is executed for the User and the result is transmitted to his browser 38.

The same procedure is now described with a so called Man in the Middle shown in FIG. 5. It is assumed that "the man in the middle" (MALLORY) is listening to the traffic coming from the user and that MALLORY is able to transmit corresponding traffic to the User. Such position is usually obtain through procedures called phising (or phishing) but also other alternatives are possible, e.g. a possibility to follow the traffic at a dial-up connection or within the infrastructure of a cable installation, without necessarily interfering within this traffic while gathering information.

Therefore the webserver of MALLORY can act as a proxy, at least in some instances. However, it is also possible that the eavesdropper only gathers information for using it later or subsequently through terminating BOB's access to the net and taking his place. In case that the following description mentions that MALLORY is forwarding something unchanged, MALLORY may be simple eavesdropping (usually before taking over control and acting instead of BOB).

BOB enters 21 the AXS-card number (IDT) provided 22 by the card 1 as username (can also be something different as mentioned above). IDT is sent 21 to MALLORY, which sends 211 it unchanged to the official net banking site (BANK). BANK creates 23 a session Codebook (Cx) for the User and stores it as such. Cx and IDT are sent 24 to the Authentication Service Provider (AuSP) for an Authentication Request. AuSP creates a Challenge (CHAL) and encrypts CHAL and the codebook information Cx with the public key of the logical card (PubX). This is sent 25 back to the BANK. BANK sends 26 the request back to MALLORY which sends it 126 unchanged, i.e. in a transparent way, back to BOB.

BOB's browser transmits the request using the optical interface into the card 2 as mentioned above or uses another means. The card 2 extracts 29 CHAL and Cx and displays 27 and 28 them. BOB has now the choice between different options within the n codebook options C1 to Cn from Cx. He then enters 30 Ca in his browser. The browser transmits 31 this choice to MALLORY. Independent from the attitude MALLORY may have, he cannot evaluate or know the content of this transmission and therefore usually transmit this information unchanged as such. In case he tries to interfere at that point, the following procedure will not be successful and BOB's choice will not be executed but also no other (malevolent) choice can be executed.

Therefore the remaining procedure is running equivalent to the procedure according to FIG. 4, i.e. BANK sends 35 CHAL and the chosen code Ca to the AuSP. AuSP verifies 36 CHAL and sends 37 the result of the verification, i.e. the acknowledgement of the User and the Ca action back to BANK. The BANK interprets 138 Ca on the basis of the onetime code with secret semantics, i.e. the Session Codebook Cx for the User and if this interpretation is verified correct than the transaction Ca is executed for the User and the result is transmitted to his browser 38.

FIG. 6 shows a simplified block diagram of the configuration shown in FIG. 5. The user at the local user infrastructure 1 requests a login on a fake service provider web server 4. This fake service provider web server 4, together with a fake user terminal equipment 5, constitutes mainly the raider infrastructure 3 of the man in the middle, MALLORY.

The login request is communicated within the raider infrastructure 3 to repeat it as a login request from the fake user equipment 5 for the structure 6 of the service provider. The True Service Provider 9 creates the secret Codebook and transmits it to the authentication server 7 creating a One Time Password (OTP) and encloses these items within a crypto-container using the public key of the autonomous mobile authentication device 2. This crypto-container is transmitted to the requesting system, here the man in the middle, who is forced to transmit this container—unreadable to him, to the user station 1. Through use of smart card technology as described in EP 1 480 107 or EP 1 255 178 the container is detected and decrypted using the key stored in the authentication device 2, preferably protected by biometric data. The secret codebook is extracted and entered into an i/o-device of the user terminal equipment 1, thus showing the user the n options from C1 to Cn from the codebook Cx.

The user 2 now makes his choice Ca, which in the following does not have a meaning for MALLORY, and reaches it through to the true service server 9 within the service provider infrastructure 6. If said choice Ca would have been changed to Ca', AusP will not be able to verify this transaction choice and therefore it would not be executed.

Within the first embodiment MITM (man in the middle) is stopped and discarded denying him access to the data flow. Within the second embodiment MITM is stopped and (can be) ignored denying him access to the content of the data flow. This access is denied through use of a one-time codebook with semantics only known to the User and AusP.

The invention claimed is:

1. A method for setting up a secure communication line between a user and a service provider using non-secure communication channels within an insecure network, comprising the steps of:
   transmitting an identity token or identity claim from the user station to a service provider station wherein the user station and service provider station are coupled to the insecure network;
   triggering the creation of a secret URL by the service provider station upon receiving the identity token or identity claim, wherein the step of triggering the creation of the secret URL creates a crypto-container by the service provider station, wherein the crypto-container includes the secret URL encrypted with a key known to the user, wherein a secure side channel is used to transmit the crypto-container, and decrypting the crypto-container within the user station to obtain the secret URL;
   transmitting the secret URL within the secure side channel to the user station;
   obtaining the secret URL within the user station; and
   setting-up a new communication path in the insecure network that links the user and the service provider station based on the secret URL.

2. The method according to claim 1, wherein at least one of the user and the service provider performs a correct authentication.

3. The method according to claim 1, wherein a challenge response authentication protocol is used to transmit the crypto-container from the service provider station to the user station.

4. The method according to claim 1, wherein the step of obtaining the secret URL within the user station comprises the steps of:
   presenting the crypto-container through representation of information of the crypto-container via a data terminal equipment of the user station
   detecting the information by an autonomous mobile authentication device; and
   decrypting the information through the authentication device.

5. The method according to claim 4, wherein the information is presented one of optically on a screen of the data terminal equipment and audibly through speakers associated with the data terminal equipment.

6. A method for setting up a secure communication line between a user station and a service provider using non-secure communication channels within an insecure network, comprising the steps of:
   transmitting an identity token or identity claim from the user station to a service provider station, wherein the user station and service provider station are coupled to the insecure network;
   triggering the creation of a secret codebook by the service provider station upon receiving the identity token or identity claim wherein
   step of triggering the creation of the secret codebook comprises creating a crypto-container by the service provider station, wherein the crypto-container includes the secret codebook encrypted with a key known to the user, wherein the secure side channel is used to transmit the crypto-container, and decrypting the crypto-container within the user station to obtain the secret codebook;
   transmitting the secret codebook within the secure side channel to the user computer;
   obtaining the secret codebook within the user computer; and
   transmitting a choice from the codebook to the service provider computer.

7. The method according to claim 6, wherein at least one of the user and the service provider performs a correct authentication.

8. The method according to claim 6, wherein a challenge response authentication protocol is used to transmit the crypto-container from the service provider station to the user station.

9. The method according to claim 6, wherein the step of obtaining the secret codebook within the user station comprises the steps of:
   presenting the crypto-container through representation of information of the crypto-container via a data terminal equipment of the user station detecting the information by an autonomous mobile authentication device; and decrypting the information through the authentication device.

10. The method according to claim 9, wherein the information is presented one of optically on a screen of the data terminal equipment and audibly through speakers associated with the data terminal equipment.

11. A system for setting up a secure communication line between a user computer and a service provider computer using non-secure communication channels within an insecure network, comprising:

a user computer coupled to the insecure network through a first data terminal equipment;

a service provider computer coupled to the insecure network through a second data terminal equipment;

a communication path in the insecure network linking the user computer and the service provider computer;

a first communication unit for communicating a request from the user computer to the service provider station;

a URL creation module for creating a URL within the service provider computer, wherein the service provider computer creates a crypto-container, wherein the crypto-container includes the URL encrypted with a key known to the user, wherein a secure side channel is used to transmit the crypto-container, and decrypting the crypto-container within the user computer to obtain the URL;

a second communication unit for communicating the URL from the service provider computer to the user computer within a secure side channel;

a URL accessing unit for accessing the URL by the user; and a set-up module for setting-up a new communication path in the insecure network linking the user computer and the service provider computer based on the URL.

12. A system for setting up a secure communication line between a user computer and a service provider computer using non-secure communication channels within an insecure network, comprising:

a user computer coupled to the insecure network through a first data terminal equipment;

a service provider computer coupled to the insecure network through a second data terminal equipment;

a communication path in the insecure network linking the user computer and the service provider computer;

a first communication unit for communicating a request from the user computer to the service provider computer;

a codebook creation module for creating a codebook within the service provider computer the service provider computer further creates a crypto-container, wherein the crypto-container includes the codebook encrypted with a key known to the user, wherein the secure side channel is used to transmit the crypto-container, and decrypting the crypto-container within the user station to obtain the codebook;

a second communication unit for communicating the codebook from the service provider computer to the user computer within a secure side channel;

a codebook accessing unit for accessing the codebook by the user computer; and a codebook choice display menu module for enabling and transmitting the choice of one of the codebook options to communicate the choice in the insecure network linking the user computer and the service provider computer based on knowledge of the codebook.

* * * * *